Figure 1:
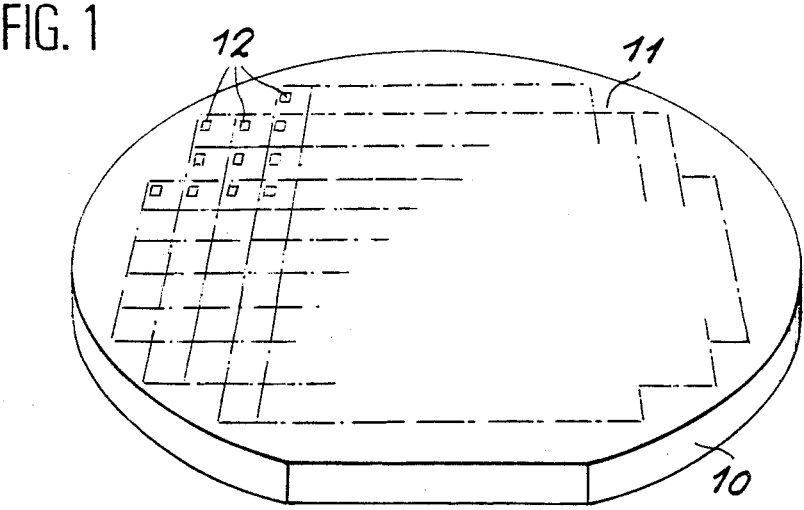

United States Patent [19]

Lazzari

[11] Patent Number: 4,901,177
[45] Date of Patent: Feb. 13, 1990

[54] MAGNETIC READ HEAD FOR A VERY NARROW TRACK

[75] Inventor: Jean-Pierre Lazzari, Corenc, France

[73] Assignee: Commissariat a l'Energie Atomique, Paris, France

[21] Appl. No.: 167,729

[22] Filed: Mar. 14, 1988

[30] Foreign Application Priority Data

Mar. 19, 1987 [FR] France ............................. 87 03821

[51] Int. Cl.⁴ .............................................. G11B 5/30
[52] U.S. Cl. ................................................. 360/113
[58] Field of Search ...................................... 360/113

[56] References Cited

U.S. PATENT DOCUMENTS 3,800,193 3/1974 Ashar et al. .
4,388,662 6/1983 Jeffers ................................ 360/113

FOREIGN PATENT DOCUMENTS 96741 2/1983 European Pat. Off. .
2205799 2/1972 Fed. Rep. of Germany .
55-42370 3/1980 Japan .
58-70416 4/1983 Japan .
58-85916 5/1983 Japan .
59-2221 1/1984 Japan .

OTHER PUBLICATIONS

IBM Technical Disclosure Bulletin, vol. 22, No. 1, Jun. 1979, p. 331, New York, U.S.; J. W. Beck et al, "Magnetic Head Assembly Including Head Circuitry".

Primary Examiner—A. J. Heinz
Attorney, Agent, or Firm—Oblon, Spivak, McClelland, Maier & Neustadt

[57] ABSTRACT

Magnetic read head for very narrow track and production process. On a silicon substrate (10) is formed a magnetic circuit (P1, P2, P3), whose thickness is equal to the width of the track to be read. This magnetic circuit is interrupted by a magnetic spacer (20) and two slots (F1, F2), in which are inserted elements sensitive to the magnetic field, e.g. magnetoresistors. The latter are connected to an integrated circuit (12) in the silicon substrate. Application to the reading of information recorded on a magnetic track.

2 Claims, 5 Drawing Sheets

U.S. Patent    Feb. 13, 1990    Sheet 1 of 5    4,901,177

MAGNETIC READ HEAD FOR A VERY NARROW TRACK

DESCRIPTION

The present invention relates to a magnetic read head for a very narrow track and to a process for the production of said head.

For increasing the surface of recording informations on a support in the form of a disk or tape, it is possible to either increase the number of bits per unit of length in the magnetic track travel direction or increase the number of recording tracks.

The first solution rapidly leads to insurmountable difficulties, because it is necessary to continuously reduce the separation between the read head and the recording layer. Although the second solution appears more attractive, it is also not free from problems. Thus, it involves the use of very narrow tracks, which leads to problems in the production of the read head. As the read signal is proportional to the track width, it becomes very weak for a very narrow track. Moreover, the precision required for the head gap increases, which leads to technical problems.

The object of the present invention is to propose a read head especially intended for the reading of very narrow tracks, both as a result of its special construction and as a result of its sensitivity to the magnetic field. According to the invention, the head gap is defined by an amagnetic spacer obtained by the deposition and etching of thin films. It therefore has a very limited width and a very great accuracy. It is therefore easy to complete the means by a thin magnetic film (approximately 1 micrometer) located on either side of the spacer and which will thus define a head gap, whose width is the same as the track to be read. Thus, the track can be very narrow (approximately 1 micrometer).

In the prior art, the pole pieces (i.e. the head gap) were produced by photolithography, so that the width finally obtained for the head gap lacked precision and was large (a few micrometers). This procedure is e.g. described in U.S. Pat. No. 3 800 193.

As regards the sensitivity, it is increased by obviating the conventional winding making it possible to sense the magnetic flux variations and instead use is made of elements, one of whose electrical characteristics is sensitivity to the magnetic field. They are e.g. magnetoresistors, magnetodiodes, magnetotransistors, etc., which are connected in opposition and to an integrated circuit diffused into the substrate carrying the magnetic circuit.

Figure 2:
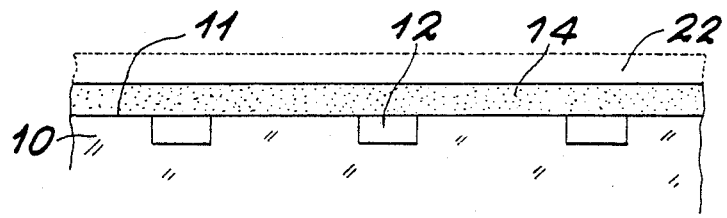
Figure 3:
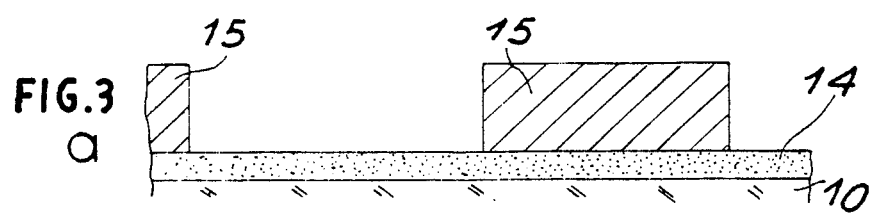
Figure 3:
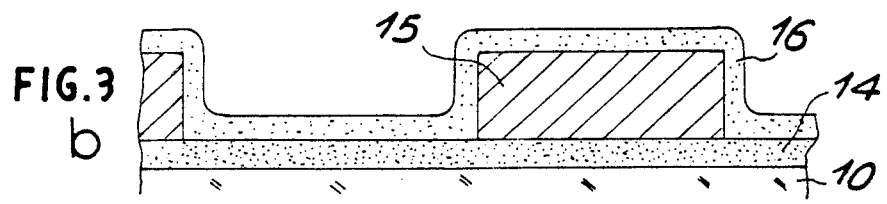
Figure 3:
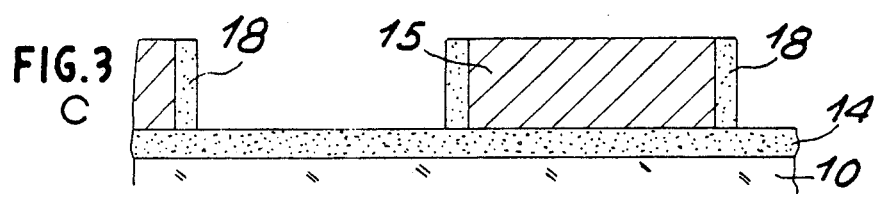
Figure 3:
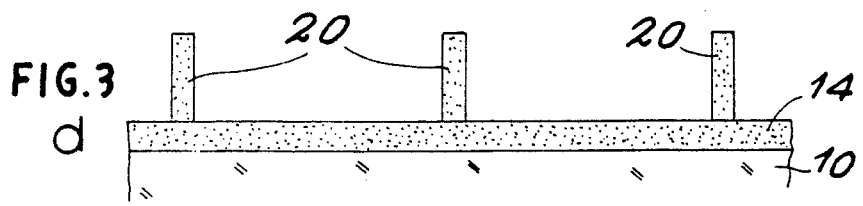
Figure 5:
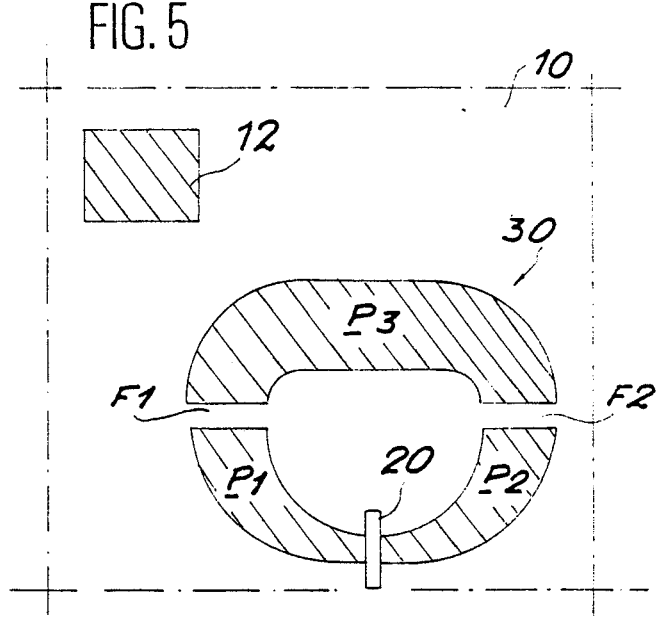
Figure 6:
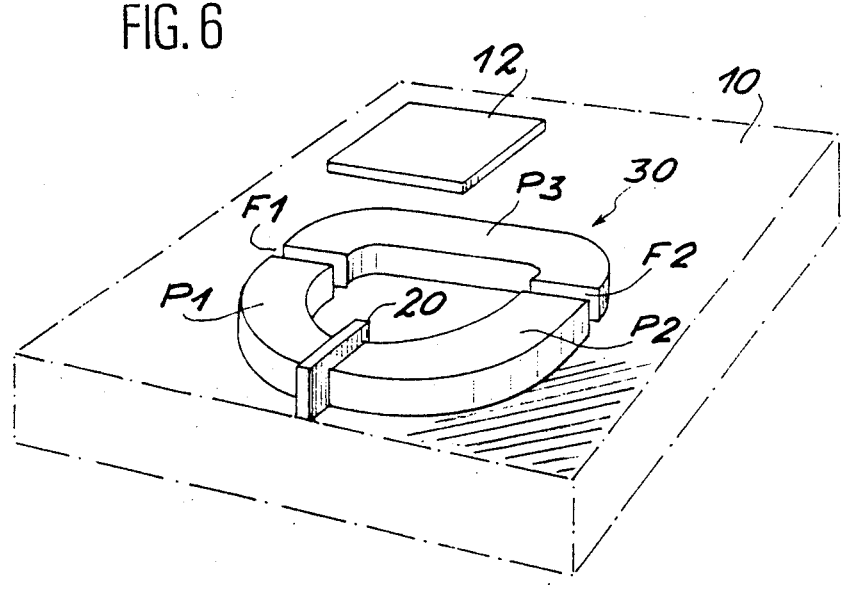
Figure 7:
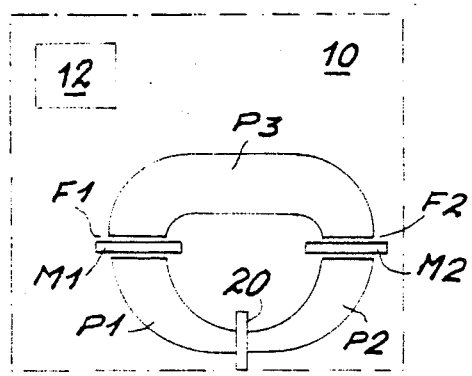
Figure 8:
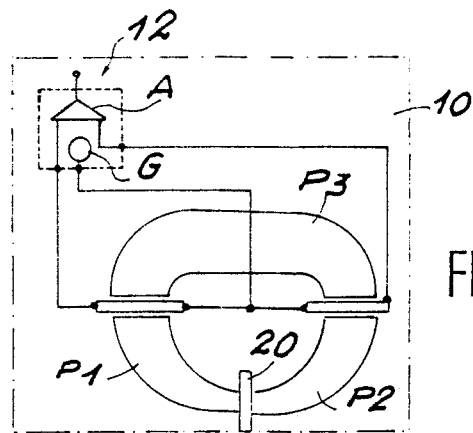
Figure 9:
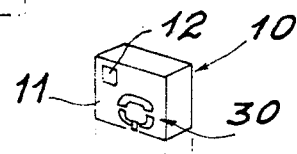
Figure 10:
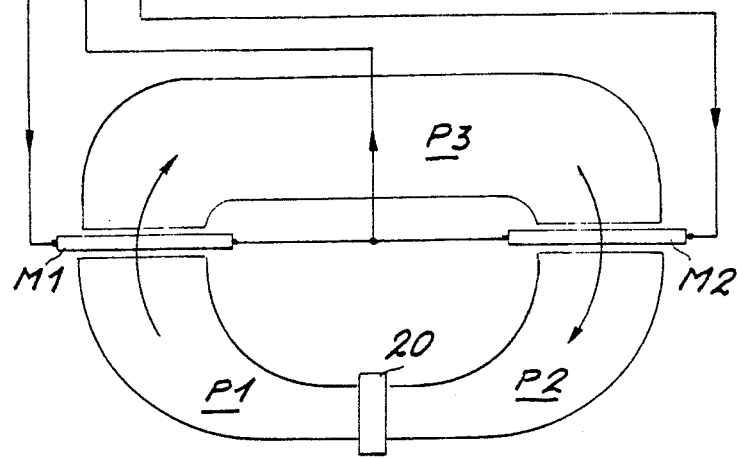
Figure 11:
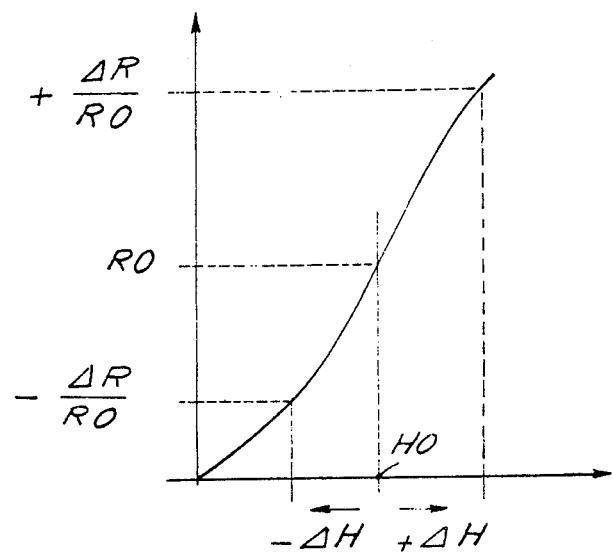

The invention is described in greater detail hereinafter relative to non-limitative embodiments and the attached drawings, wherein show:

FIG. 1 A silicon wafer with integrated circuits.
FIG. 2 A section through said wafer.
FIG. 3 Various stages in a process for producing amagnetic spacers
FIG. 4 A silicon wafer with integrated circuits and spacers.
FIG. 5 A plan view of a magnetic film in a first embodiment.
FIG. 6 A magnetic circuit in a second embodiment.
FIG. 7 The magnetic circuit with its magnetoresistors.
FIG. 8 The assembly following the connection of the magnetoresistors in the integrated circuit.
FIG. 9 The fixing of a component to a moving block.
FIG. 10 The direction of the magnetic induction and the electric magnetization currents.
FIG. 11 A diagram showing the resistance variation of the magnetoresistors as a function of the magnetic field.

FIG. 1 shows a monocrystalline silicon wafer 10 having an upper face 11 on which is formed electronic circuits 12, e.g. using the conventional microelectronics means. Each circuit comprises at least one regulated current generator and a differential amplifier.

FIG. 2 shows in section the substrate 10 with its circuits 12. An e.g. $SiO_2$ insulating coating 14 is deposited on the assembly in order to insulate the circuits.

The production process can take place according to two variants:

First variant

Amagnetic spacers are formed by a known method illustrated in FIG. 3. For this purpose, an insulating coating 15 is deposited and etched to bring about the appearance of vertical walls where it is wished to form the spacers (part a). The thickness of this coating is at least equal to the width of the track to be read. An amagnetic material coating 16 is deposited on the assembly (part b).

All the horizontal parts of coating 16 are removed so as to only leave the vertical walls 18 (part c). The remainder of coating 15 is removed (part d), which leaves the spacers 20 on coating 14.

Figure 4:
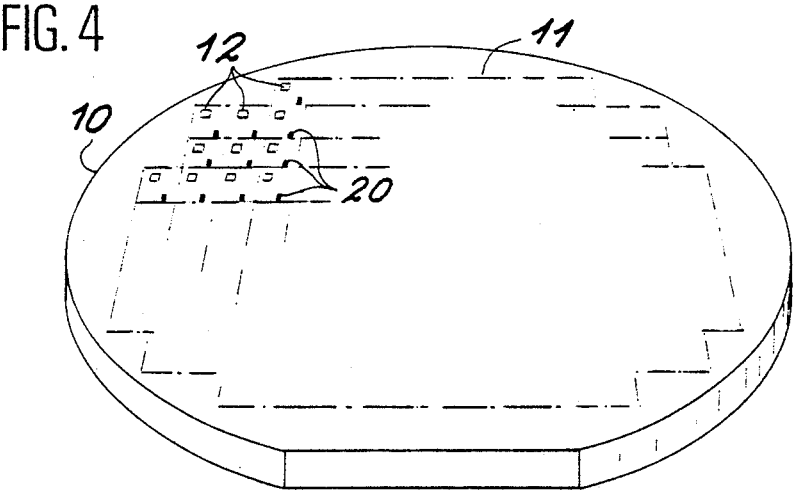

FIG. 4 illustrates the silicon wafer 10 with the integrated circuits 12 and the amagnetic spacers 20. Naturally, scales have not been respected in this drawing.

On the assembly is then deposited a high permeability magnetic material coating, the thickness of which is equal to the width of the track to be read. This coating is etched to give it the form illustrated in FIG. 5, so as to form a loop-like circuit 30 with two pole pieces P1, P2 separated by a spacer 20 and a rear part P3 separated from the pole pieces by slots F1 and F2 with a width of a few micrometers. This magnetic circuit is in the vicinity of integrated circuit 12.

Second Variant

Onto the insulating coating 14 (FIG. 2) is deposited a thin conductive coating 22 (in broken line form in FIG. 2) and then spacers are formed in the manner illustrated in FIG. 3. This is followed by the deposition of a resin coating, which is etched in accordance with the form shown in FIG. 5 (the resin remaining outside the hatched area in FIG. 5). Thus, the metal coating is exposed in the etched parts.

Using an electrolyte process, on said metallic coating is grown a high permeability magnetic coating until its thickness reaches the width of the track to be read. The resin is then removed. A magnetic circuit 30 as shown in perspective in FIG. 6 is obtained with its spacer 20 and its two slots F1 and F2. This circuit 30 is still in the vicinity of the integrated circuit 12. This is followed by the removal of the thin metallic coating 22 at the point where it was exposed, i.e. outside the magnetic circuit.

The production process then continues in the following way for both variants. On the assembly is deposited by cathodic sputtering a thin iron-nickel film, which is etched so as to only leave behind in slots F1 and F2 thin strips forming magnetoresistors M1 and M2. As illustrated in FIG. 7, these thin strips are not in electric contact with the magnetic circuit.

In place of magnetoresistors, it would be possible to insert in slots F1 and F2, magnetodiodes or magnetotransistors produced directly on the silicon substrate.

This is followed by the formation of electrical connections between magnetoresistors M1 and M2 and each integrated circuit 12, more particularly with the regulated current generator G and the differential amplifier A. These connections are obtained by the deposition of thin conductive material strips. The output of the amplifier constitutes the output of the read head (cf. FIG. 8).

This leads to a large number of components, each formed by a magnetic circuit 30 and an integrated circuit 12. These components are subdivided and inserted in a flight or moving block 32, as illustrated in FIG. 9. Assembly takes place by bonding or welding to the glass. The complete block comprises a flight or moving plane 34 and is shaped like a catamaran. The tracks 36 and 38 pass beneath the head gap of each magnetic circuit. Face 11, on which is located the integrated circuit 12 and the magnetic circuit 30, is perpendicular to the moving plane 34 and parallel to tracks 36, 38.

It is apparent that the track width is equal to the thickness of the magnetic coating forming the circuit. Thus, this width can be very small and approximately 1 micron.

FIGS. 10 and 11 provide a better understanding of the operation of the read head according to the invention once it has been completed.

In FIG. 10, the arrows in the magnetic circuit show the magnetization direction during reading and the arrows in the electrical connections the direction of the current flowing through the magnetoresistors. The latter are polarized by known, not shown means (autopolarization, "barber poles", etc.).

This polarization is linked with the reading current and the magnetization, in such a way that the resistance variation is opposite in the two magnetoresistors, i.e. such that the resistance increases in one of the magnetoresistors, whereas it decreases in the other for the same magnetization variation.

FIG. 11 shows the variation curve of the resistance R of a magnetoresistor as a function of the magnetic field applied. For a polarization field Ho, the magnetoresistor has a resistance Ro. For a variaton $\Delta H$, there is a relative variation $\Delta R/Ro$ for one of the magnetoresistors and $-\Delta R/Ro$ for the other. The current unbalance obtained at the inputs of the differential amplifier is then proportional to $2 \Delta R/Ro$. By polarization, the value of Ho is chosen to correspond to the maximum slope of the curve (inflection point).

I claim:
1. A magnetic read head comprising:
   a semiconductor substrate having an upper face;
   a spacer formed by a magnetic vertical wall perpendicular to said upper face, said spacer having a height at least equal to the width of a track to be read;
   a loop-like magnetic circuit formed by a magnetic coating, said circuit having two pole pieces separated by said spacer, said magnetic circuit being interrupted by two slots arranged symmetrically with respect to a plane passing through said spacer;
   two elements having an electric property sensitive to a magnetic field, said two elements being inserted in said slots,
   an electronic circuit integrated in said semiconductor substrate, said circuit having at least one regulated current generator (G) and a differential amplifier (A) with two inputs respectively connected to the two elements sensitive to the magnetic field and connected in opposition, said amplifier having an output supplying a reading signal.
2. A read head according to claim 1, wherein the elements (M1, M2) having an electrical property sensitive to the magnetic field are magnetoresistors, said magnetoresistors being connected in opposition to the inputs of the differential amplifier (A), the two magnetoresistors (M1, M2) being polarized in such a way that their resistance varies in opposite directions for the magnetic flux variation which they undergo.

* * * * *